(12) United States Patent
Hong et al.

(10) Patent No.: US 7,441,957 B2
(45) Date of Patent: Oct. 28, 2008

(54) FLUID DYNAMIC BEARING

(75) Inventors: Chu-Wan Hong, Guangdong (CN); Jung-Yuan Wu, Guangdong (CN)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 383 days.

(21) Appl. No.: 11/164,665

(22) Filed: Dec. 1, 2005

(65) Prior Publication Data

US 2006/0192451 A1   Aug. 31, 2006

(30) Foreign Application Priority Data

Jan. 28, 2005  (TW) .............................. 94102630 A

(51) Int. Cl.
 *F16C 32/06* (2006.01)
(52) U.S. Cl. .................................................. 384/100
(58) Field of Classification Search ................ 384/100, 384/107–120, 292; 310/90; 360/99.08, 98.07; 417/354, 423.12, 423.13
See application file for complete search history.

(56) References Cited

U.S. PATENT DOCUMENTS

| | | | |
|---|---|---|---|
| 3,150,822 A * | 9/1964 | Dreyfus et al. .............. 415/111 |
| 4,961,122 A * | 10/1990 | Sakai et al. .............. 360/271.3 |
| 5,381,456 A * | 1/1995 | Vetter et al. .................. 378/132 |
| 5,427,456 A * | 6/1995 | Hensel ........................ 384/112 |
| 5,871,285 A * | 2/1999 | Wasson ...................... 384/118 |
| 6,118,620 A * | 9/2000 | Grantz et al. ............. 360/99.08 |
| 6,206,572 B1 * | 3/2001 | Kobayashi et al. .......... 384/278 |
| 6,276,831 B1 * | 8/2001 | Takahashi et al. ........... 384/100 |
| 6,350,059 B1 | 2/2002 | Takahashi |
| 6,502,989 B1 * | 1/2003 | Takeuchi et al. ............ 384/100 |
| 6,552,456 B2 | 4/2003 | Goto et al. |
| 6,702,464 B1 * | 3/2004 | Takeuchi et al. ............ 384/107 |
| 7,090,401 B2 * | 8/2006 | Rahman et al. ............. 384/114 |
| 2007/0253651 A1 * | 11/2007 | Gotoh et al. ................ 384/107 |

FOREIGN PATENT DOCUMENTS

| | | |
|---|---|---|
| CN | 1382919 A | 12/2002 |
| CN | 1576623 A | 2/2005 |
| JP | 2001-339905 A | 12/2001 |

\* cited by examiner

*Primary Examiner*—Thomas R Hannon
(74) *Attorney, Agent, or Firm*—Winston Hsu

(57) ABSTRACT

A fluid dynamic bearing assembly includes a bearing sleeve (30) having an inner surface and a rotary shaft (30) rotatably received in the bearing sleeve. The rotary shaft has an outer surface. One of the inner surface of the bearing sleeve and the outer surface of the rotary shaft forms a dynamic pressure generating groove pattern (10). The groove pattern includes a plurality of grooves (12) extending from a center area toward one edge of the groove pattern. Each of the grooves has at least one of a depth and a width decreasing from the center area toward the edge.

14 Claims, 8 Drawing Sheets

FLUID DYNAMIC BEARING

FIELD OF THE INVENTION

The present invention relates generally to a fluid bearing, and particularly to a fluid dynamic bearing in which an enhanced capability of lubricant oil retainment is obtained by elaborately designing dynamic pressure generating grooves in the bearing.

DESCRIPTION OF RELATED ART

Due to request for low abrasion on rotational elements to achieve an extended life and for low extent of noise, fluid dynamic bearings (FDBs) have been widely used in miniature motors, such as cooling fan motors, hard disk drive motors, or the like.

In a typical FDB, a rotary shaft is rotatably inserted into a sleeve with a bearing clearance formed between the rotary shaft and the sleeve. Dynamic pressure generating grooves are formed on an inner peripheral surface of the sleeve or an outer peripheral surface of the rotary shaft. Lubricating oil is applied to the bearing clearance. A pressure is generated due to the pumping action of the dynamic pressure generating grooves caused by rotation of the rotary shaft, for separating the rotary shaft from the bearing sleeve. As a result, the rotary shaft rotates with respect to the sleeve without radial physical contact with the sleeve.

Grooves of so called herringbone type are often adopted in the FDBs. Each of such grooves is V-shaped and has first and second branches. The first branches and respective second branches intercross at center areas of the grooves. Once the rotary shaft rotates, the lubricating oil is driven from ends of the first and second branches toward the center areas to generate a high pressure thereat. This high pressure radially pushes the rotary shaft away from the sleeve, thereby preventing the physical contact between the rotary shaft and the sleeve.

In designing the FDB, one of the most important issues to be addressed is how to prevent leakage of the lubricant oil. This is because leakage of lubricant oil may cause shortage of lubricant oil, which may cause failure to establish the high pressure. For the grooves mentioned above, a small amount of the lubricant oil is received in the center areas, which will not leak out. However, the remaining, most part of the lubricant oil is received in the first and second branches. This most part of the lubricant oil is under risk of leakage. What is needed, therefore, is an FDB with enhanced capability of preventing leakage of the lubricant oil.

SUMMARY OF INVENTION

A fluid dynamic bearing assembly comprises a bearing sleeve having an inner surface and a rotary shaft rotatably received in the bearing sleeve. The rotary shaft has an outer surface. One of the inner surface of the bearing sleeve and the outer surface of the rotary shaft forms a dynamic pressure generating groove pattern. The groove pattern comprises a plurality of grooves extending from a center area toward one edge of the groove pattern. Each of the grooves has at least one of a depth and a width decreasing from the center area toward the edge.

Other advantages and novel features of the present invention will become more apparent from the following detailed description of preferred embodiment when taken in conjunction with the accompanying drawings, in which:

DETAILED DESCRIPTION

Figure 1:
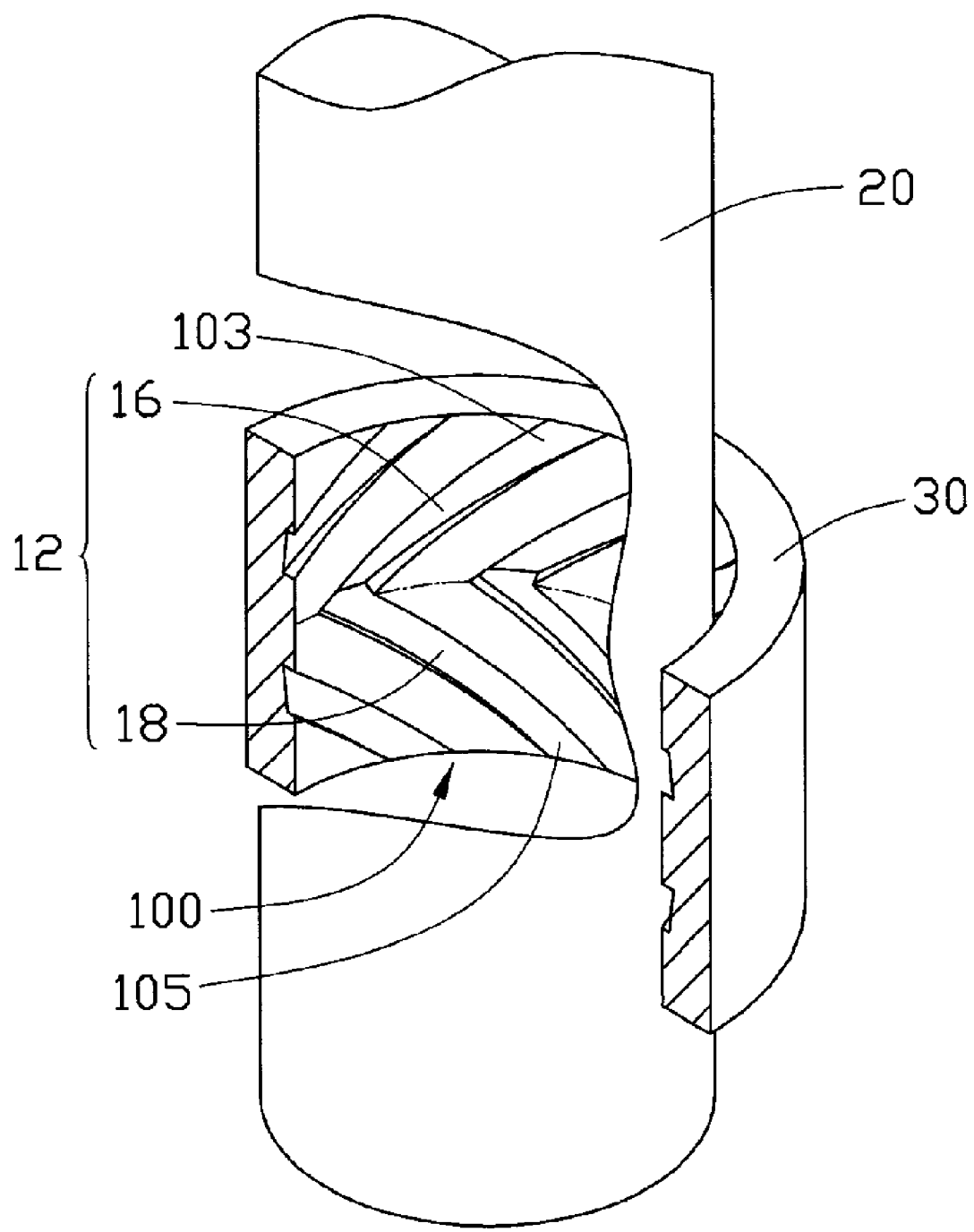
FIG. 1 is an isometric, sectional view of a fluid dynamic bearing assembly according to a first embodiment of the present invention, with portions being cut away.
Figure 2:
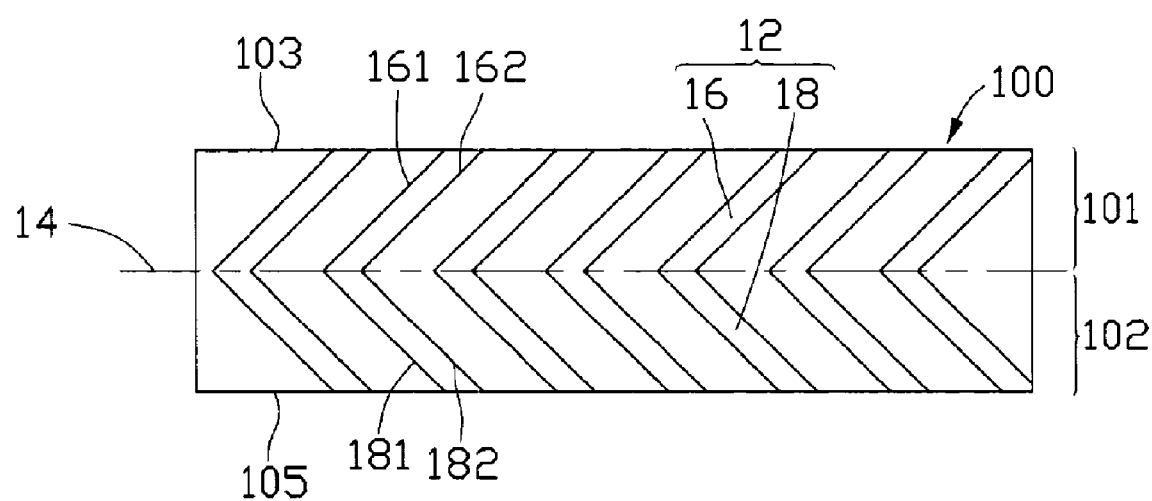
FIG. 2 is a plain view of a groove pattern of the fluid dynamic bearing of FIG. 1 under an expanded condition.

Referring to FIGS. 1 and 2, a fluid dynamic bearing (FDB) according to a first embodiment of the present invention is illustrated. The FDB comprises a bearing sleeve 30 and a rotary shaft 20 rotatably received in the bearing sleeve 30 with a bearing clearance formed therebetween. Lubricant oil is filled in the bearing clearance. A dynamic pressure generating groove pattern 100 (hereinafter "groove pattern") is formed in an inner surface of the bearing sleeve 30. The groove pattern 100 may be alternatively formed in an outer peripheral surface of the rotary shaft 20. The groove pattern 100 comprises a plurality of dynamic pressure generating grooves 12 (hereinafter "grooves"). Once the rotary shaft 20 rotates, a pressure is generated in the lubricate oil due to the pumping action of the grooves 12, for separating the rotary shaft 20 from the bearing sleeve 30.

The groove pattern 100 has a top edge 103 and a bottom edge 105, and is divided into an upper half pattern 101 and a lower half pattern 102 by a center line 14. Each of the grooves 12 is generally V-shaped and has first and second branches 16, 18 located at the upper and lower half patterns 101, 102, respectively. Each first branch 16 has two opposite first branch sides 161, 162. The first branch sides 161, 162 are straight and parallel to each other in the plain view of FIG. 2 when the bearing sleeve 30 is expanded. Likewise, each second branch 18 has two opposite second branch sides 181, 182 which are straight and parallel to each other in the plain view of FIG. 2 according to the first embodiment of the present invention. That is, each of the first and second branches 16, 18 has a uniform width.

Particularly referring to FIG. 1, a depth of each of the grooves 12 is configured to decrease from a center area toward opposite top and bottom edges 103, 105 of the groove pattern 100. In this first embodiment, each first branch 16 has a depth gradually decreased from the center line 14 toward the top edge 103 of the groove pattern 100, and each second branch 18 has a depth gradually decreased from the center line 14 toward the bottom edge 105 of the groove pattern 100. Therefore, each of the grooves 12 defines an oil reserving space in a central portion thereof, which is greater in volume than the other portions thereof. The central portions of the grooves 12 of the present invention have more space than the central portions of the grooves of the conventional FDB. More lubricating oil is thus able to be reserved in a center area of the groove pattern 100. Accordingly, less lubricating oil is under risk of leakage, which represents that by elaborately configuring the groove pattern thereof, the FDB of the first embodiment of the present invention has an improved performance regarding retaining the lubricating oil in the grooves 12.

In the first embodiment of the present invention, the depth of each of the grooves 12 linearly continuously decreases gradually from the center area toward the top and bottom edges 103, 105 of the groove pattern 100. In one modified embodiment, the depth of each of the grooves 12 is configured to decrease in a stepwise manner. That is, a plurality of gradually raised steps is formed along the first and second branches 16, 18 from the center line 14 toward the top and bottom edges 103, 105 of the groove pattern 100. The groove pattern 100 of the modified embodiment of the present invention still can form a greater oil reserving space at the center area thereof than the prior art.

Figure 3:
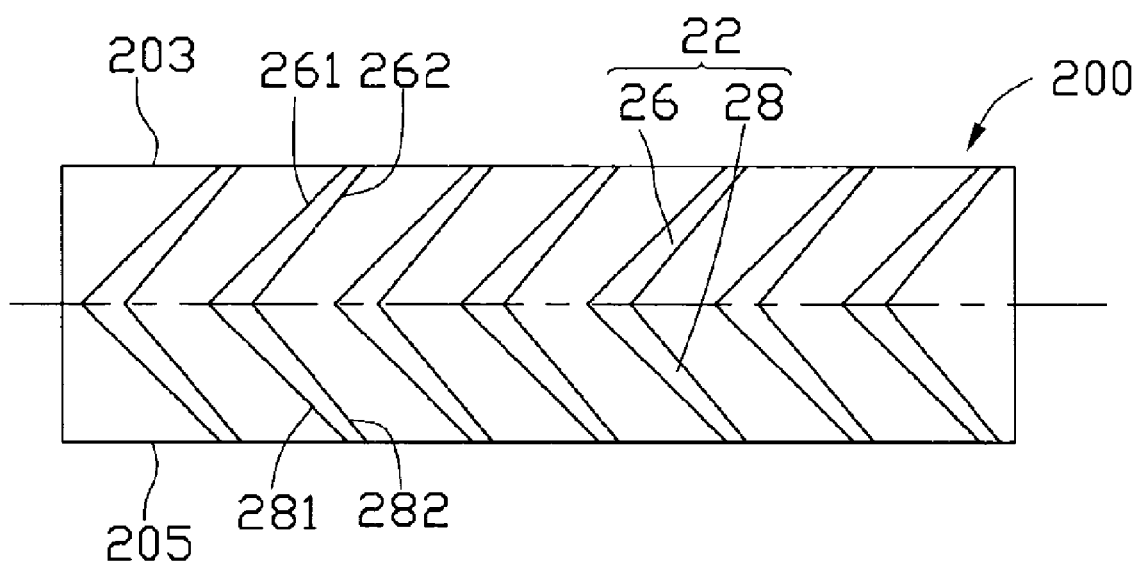
FIG. 3 is a plain view of a groove pattern of a fluid dynamic bearing under an expanded condition in accordance with a second embodiment of the present invention.

FIG. 3 is a plain view of a groove pattern 200 of an FDB in accordance with a second embodiment of the present invention. The groove pattern 200 also comprises a plurality of generally V-shaped grooves 22 each having first and second branches 26, 28. A mainly difference between the second embodiment and the first embodiment is that branch sides 261, 262 of each first branch 26 of the second embodiment are inclined to each other and define a greater distance therebetween at the center area of the groove pattern 200 than at a top edge 203 of the groove pattern 200. That is, the width of the first branch 26 is non-uniform and decreases from the center area toward the top edge 203 of the groove pattern 200. The configuration of the first branch 26 is similarly applied to the second branch 28. The branch sides 281, 282 of each of the second branches 28 are spaced from each other a distance which is gradually decreased from the center area of the groove pattern 200 toward the bottom edge 205 thereof. The depths of the first and second branches 26, 28 are uniform, while each groove 22 can define an oil reserving space at the center area of the groove pattern 200, which is greater in volume than the other areas of the groove 22. More lubricating oil is thus able to be reserved in the center area of the groove pattern 200. Accordingly, less lubricating oil is under risk of leakage, which represents that by elaborately configuring the groove pattern 200 thereof, the FDB of the second embodiment of the present invention has an improved performance regarding retaining the lubricating oil in the grooves 22.

Figure 4:
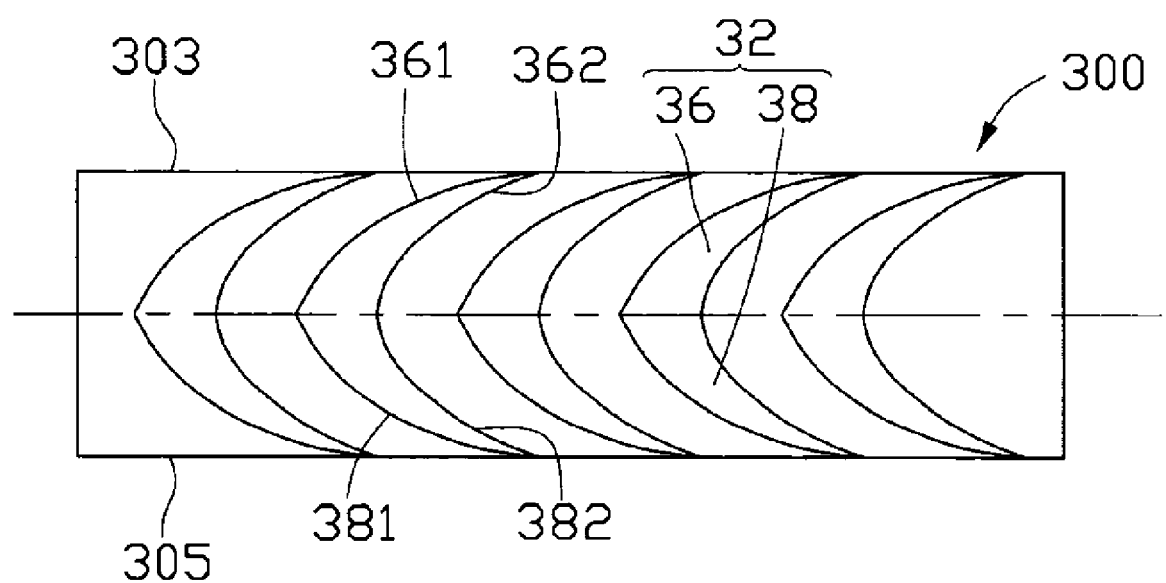
FIG. 4 is a plain view of a groove pattern of a fluid dynamic bearing under an expanded condition in accordance with a third embodiment of the present invention.

FIG. 4 is a plain view of a groove pattern 300 of an FDB according to a third embodiment of the present invention. The groove pattern 300 also comprises a plurality of generally V-shaped grooves 32 each having first and second branches 36, 38. A main difference between the third embodiment and the previous embodiments is that branch sides 361, 362 of each first branch 36 of the third embodiment are arcuate, and the branch sides 381, 382 of each second branch 38 of the third embodiment are also arcuate. The width of each first branch 36 and each second branch 38 is non-uniform and decreases from the center area toward top and bottom edges 303, 305 of the groove pattern 300, respectively. The depth of the first and second branches 36, 38 of the third embodiment are uniform, while each groove 32 can define an oil reserving space at the center area of the groove pattern 300, which is greater in volume than the other areas of the groove pattern 300. More lubricating oil is thus able to be reserved in the center area of the groove pattern 300. Accordingly, less lubricating oil is under risk of leakage, which represents that by elaborately configuring the groove pattern thereof, the FDB of the third embodiment of the present invention has an improved performance regarding retaining the lubricating oil in the grooves 32.

Figure 5:
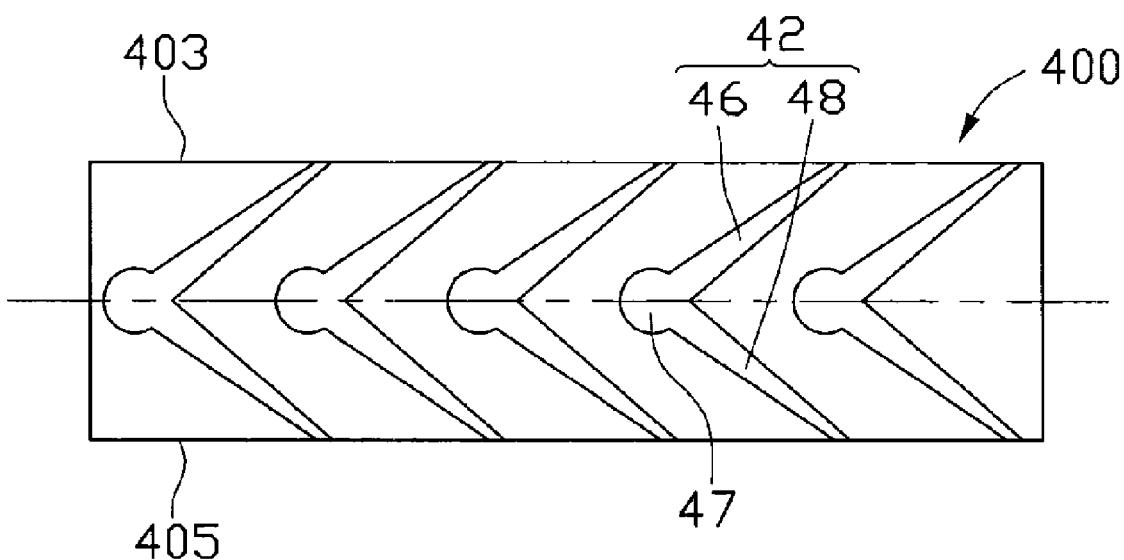
FIG. 5 is a plain view of a groove pattern of a fluid dynamic bearing under an expanded condition in accordance with a fourth embodiment of the present invention.

FIG. 5 is a plain view of a groove pattern 400 of an FDB according to a fourth embodiment of the present invention. The groove pattern 400 also comprises a plurality of V-shaped grooves 42 each having first and second branches 46, 48. Each of the first and second branches 46, 48 has a width decreasing from the center area toward top and bottom edges 403, 405 of the groove pattern 400. An oil reserving cavity 47 is defined at the center area of the groove pattern 400, communicating with both of the first and second branches 46, 48 of each groove 42. Therefore, each groove 42 of the fourth embodiment can define an oil reserving space at the center area of the groove pattern 400, which is greater in volume than the other areas of the groove pattern 400. More lubricating oil is thus able to be reserved in the center area of the groove pattern 400. Accordingly, less lubricating oil is under risk of leakage, which represents that by elaborately configuring the groove pattern thereof, the FDB of the fourth embodiment of the present invention has an improved performance regarding retaining the lubricating oil in the grooves 42. The oil reserving cavity 47 is a round cavity in this fourth embodiment, and may alternatively be triangle, quadrilateral or the like shape so long as the oil reserving cavity 47 can increase the volume of the oil reserving space at the center area of the groove pattern 400.

Figure 6:
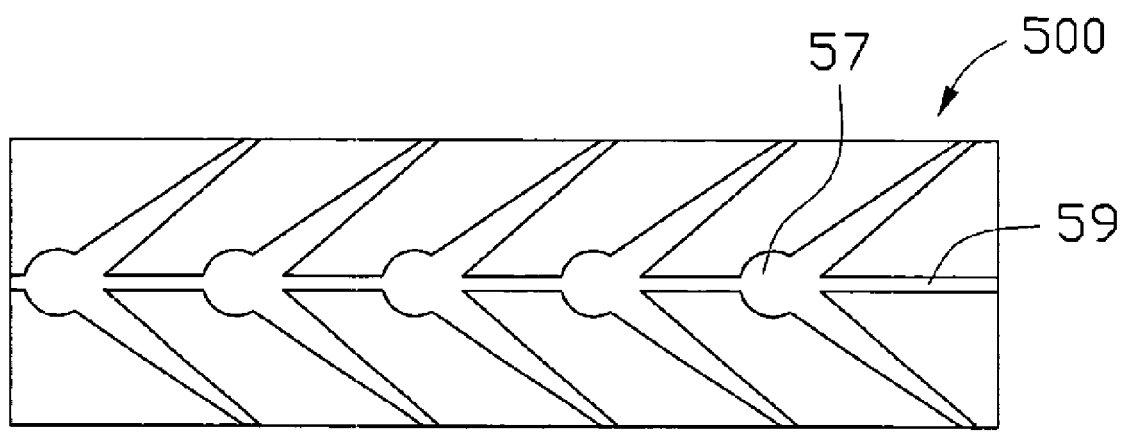
FIG. 6 is a plain view of a groove pattern of a fluid dynamic bearing under an expanded condition in accordance with a fifth embodiment of the present invention.

FIG. 6 is a plain view of a groove pattern 500 of an FDB according to a fifth embodiment of the present invention. The groove pattern 500 of the fifth embodiment is a modification of the groove pattern 400 of the fourth embodiment. The modification is that a plurality of oil channels 59 is formed at the center area of the groove pattern 500 to communicate the oil reserving cavities 57 with one other. This further increases the oil reserving space formed at the center area of the groove pattern 500, which can reserve more lubricating oil at the center area of the groove pattern 500. Therefore, the FDB having the groove pattern 500 of the fifth embodiment has a further improved capability regarding retaining the lubricating oil in the grooves.

Figure 7:
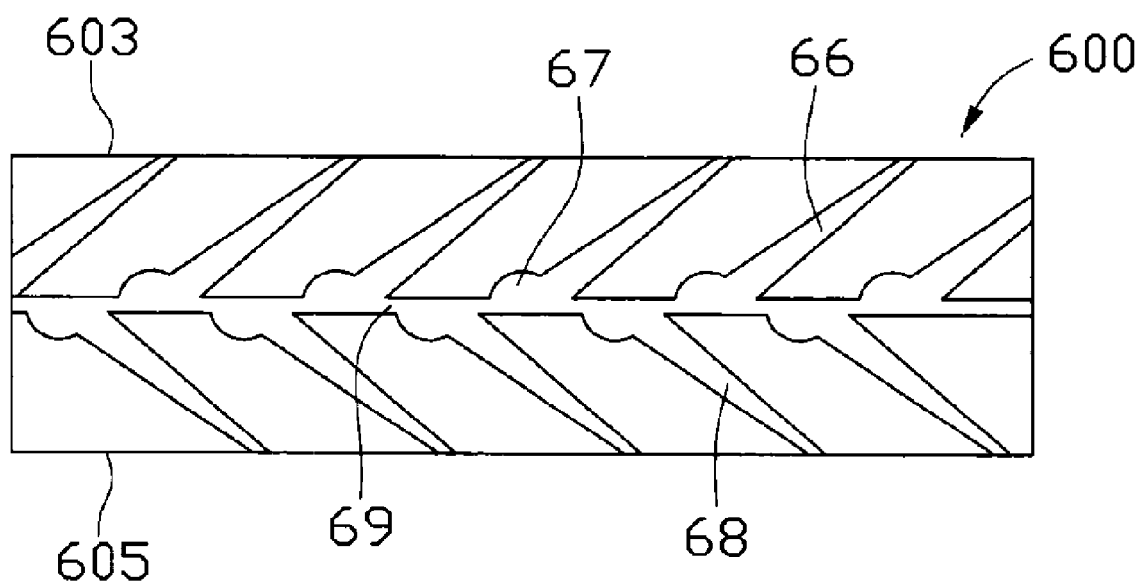
FIG. 7 is a plain view of a groove pattern of a fluid dynamic bearing under an expanded condition in accordance with a sixth embodiment of the present invention.

FIG. 7 is a plain view of a groove pattern 600 of an FDB according to a sixth embodiment of the present invention. A main difference between the sixth embodiment and the previous fifth embodiment is that the first branches 66 and the second branches 68 of the sixth embodiment are not directly connected with each other to form the V-shaped grooves. The first and second branches 66, 68 are alternated along a circumferential direction of the groove pattern 600. The width of the first and second branches 66, 68 decreases from the center area toward top and bottom edges 603, 605 of the groove pattern 600. Oil reserving cavities 67 are formed at the center area of the groove pattern 600, communicating with the first and second branches 66, 68, respectively. Oil channels 69 are formed to communicate the oil reserving cavities 67 with one another. It would be well known by skilled person that the width distribution of the branches 66, 68 and the provision of the oil reserving cavities 67 and oil channels 69 of this sixth embodiment can increase the volume of the oil reserving space formed at the center area of the groove pattern 600.

Figure 8:
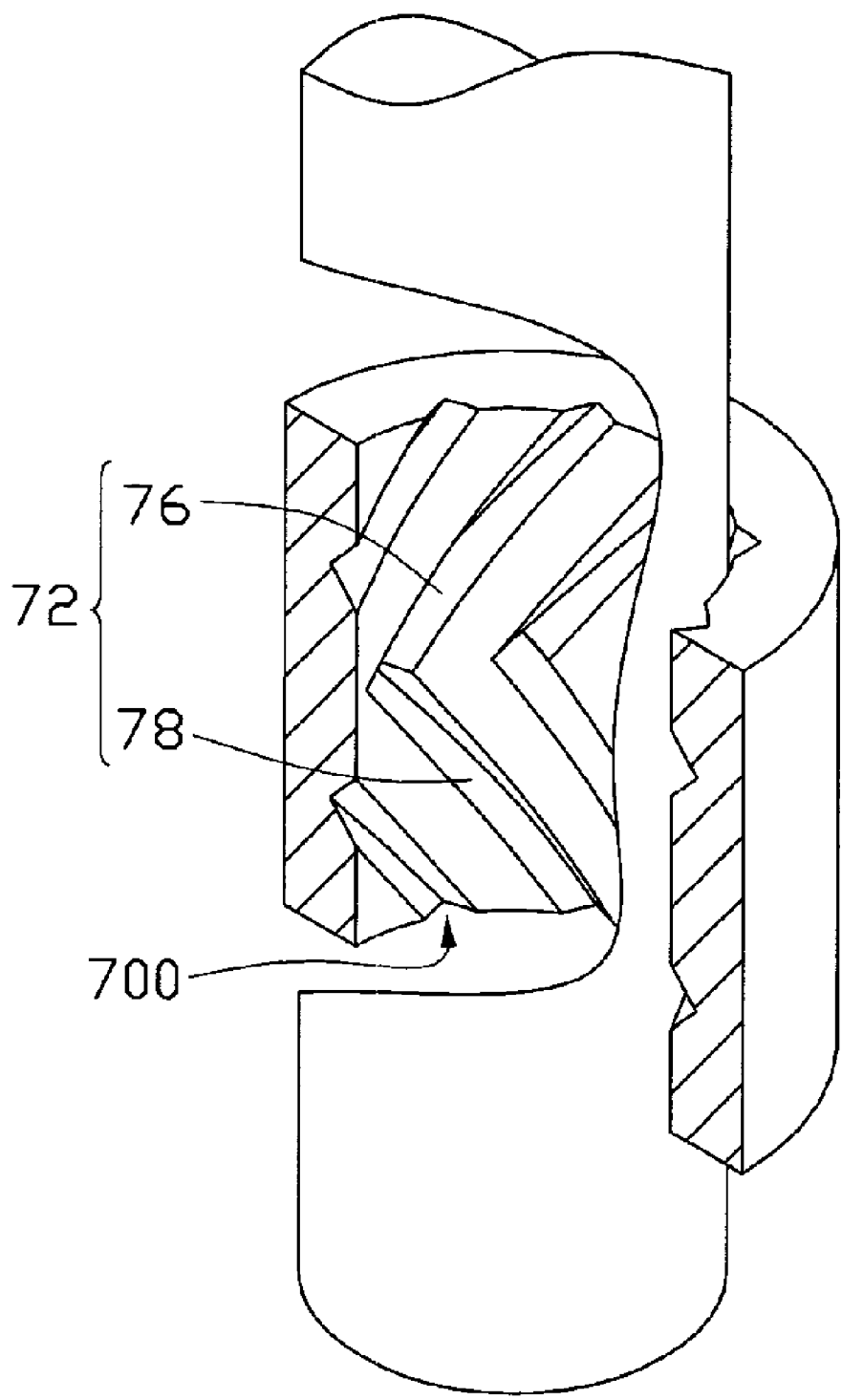
FIG. 8 is a view similar to FIG. 1, but showing a fluid dynamic bearing assembly according to a seventh embodiment of the present invention.

Referring to FIG. 8, an FDB with a groove pattern 700 according to a seventh embodiment of the present invention is shown. A difference between the seventh embodiment and the previous embodiments is that each of first and second branches 76, 78 of grooves 72 of the seventh embodiment has a triangle cross-section. The depth of the grooves 72 decreases from the center areas toward top and bottom edges of the grooves 72, which enables the center areas of the grooves 72 to have more oil reserving space therein. The cross-section of the grooves 72 may alternatively be rectangle, trapezoid or the like so long as the grooves 72 at the center areas thereof form a larger oil reserving space than the other areas of the grooves 72.

The above embodiments of the present invention have described a variety of techniques or designs for groove patterns of FDBs including, among others, the branch depth configuration, branch width configuration, branch shape configuration, branch cross-section configuration, oil cavity configuration, oil channel configuration. It would be well known by skilled person that one particular FDB could selectively adopt one or more of the techniques according to requirements of the FDB, provided the disclosure of the present invention. For example, the branch depth configuration technique and the branch width configuration technique can be applied in one particular FDB at the same time, to construct the FDB with a groove having both depth and width decreasing from the center area toward edges of the groove pattern.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fluid dynamic bearing assembly comprising:
a bearing sleeve having an inner surface; and
a rotary shaft rotatably received in the bearing sleeve, the rotary shaft having an outer surface, one of the inner surface of the bearing sleeve and the outer surface of the rotary shaft forming a dynamic pressure generating groove pattern, the groove pattern comprising a plurality of grooves extending from a center area toward one edge of the groove pattern, at least one of a depth and a width of each of the grooves decreasing from the center area toward the edge;
wherein each of the grooves is generally V-shaped and has first and second branches;
wherein oil reserving cavities are formed at the center area, communicating with both of the first and second branches of the grooves; and
wherein oil channels are formed at the center area to communicate the oil reserving cavities with one another.

2. The fluid dynamic bearing assembly of claim 1, wherein each of the first and second branches has two opposite sides, and the two opposite sides are straight and parallel to each other.

3. The fluid dynamic bearing assembly of claim 1, wherein each of the first and second branches has two opposite sides, and the two opposite sides are arcuate.

4. The fluid dynamic bearing assembly of claim 1, wherein each of the oil reserving cavities is one of a round cavity, a triangle cavity and a rectangular cavity.

5. The fluid dynamic bearing assembly of claim 1, wherein the groove pattern comprises an upper half pattern and a lower half pattern, the grooves comprise a plurality of first and second branches alternatingly located at the upper and lower half patterns respectively, along a circumferential direction of the groove pattern.

6. The fluid dynamic bearing assembly of claim 1, wherein a cross-section of each of the grooves is one of a triangle, a rectangular and a trapezoid.

7. A fluid dynamic bearing assembly comprising a pair of relatively rotatable surfaces, one of which forms thereon a dynamic pressure generating groove pattern comprising a plurality of first and second groove branches extending from a center area toward top and bottom edges of the groove pattern, respectively, a plurality of oil reserving cavities being formed in the center area and communicating with the first and second groove branches;
wherein each of the first and second groove branches has a depth decreasing from the center area toward respective one of the top and bottom edges of the groove pattern; and
wherein the depth of the first and second groove branches decreases gradually.

8. The fluid dynamic bearing assembly of claim 7, wherein each of the first and second groove branches has a width deceasing from the center area toward respective one of the top and bottom edges of groove pattern.

9. The fluid dynamic bearing assembly of claim 7, wherein the first and second groove branches are located at upper and lower halves of the groove pattern respectively, and intercross at the center area to form a plurality of generally V-shaped grooves, and each of the oil reserving cavities communicates with both of the first and second groove branches of a corresponding groove.

10. The fluid dynamic bearing assembly of claim 7, wherein oil channels are formed at the center area to communicate the oil reserving cavities with one another.

11. The fluid dynamic bearing assembly of claim 7, wherein the first and second groove branches are located at upper and lower halves of the groove pattern respectively, and alternatingly arranged along a circumferential direction of the groove pattern, each of the oil reserving cavities communicates with a corresponding one of the first and second groove branches, and the oil reserving cavities communicate with one another.

12. A fluid dynamic bearing assembly comprising:
a sleeve;
a shaft rotatably received in the sleeve; and
a dynamic pressure generating groove pattern formed on one of the shaft or the sleeve whereby when the shaft is rotated, lubricant oil received between the shaft and the sleeve can generate fluidic pressure to the sleeve to separate the sleeve from the shaft, the groove pattern comprising a plurality of grooves, each of the grooves having a central portion and two branches, the central portion having a volume which is larger than any of the other portions of the each of the grooves;
wherein the central portion of the each of the grooves has a width that is larger than any of the other portions of the each of the grooves.

13. The fluid dynamic bearing assembly of claim 12, wherein the central portions of the grooves are communicated with each other.

14. The fluid dynamic bearing assembly of claim 12, wherein the central portion of the each of the grooves has a depth that is larger than any of the other portions of the each of the grooves.

* * * * *